United States Patent Office 3,538,183
Patented Nov. 3, 1970

3,538,183
ISOPARAFFIN-OLEFIN ALKYLATION UTILIZING AN ADMIXTURE OF ALKYLATING CATALYST WITH AN AROMATIC POLYCYCLIC COMPOUND
George L. Hervert, Downers Grove, Ill., assignor to Universal Oil Products Company, Des Plaines, Ill., a corporation of Delaware
No Drawing. Filed Dec. 16, 1968, Ser. No. 784,222
Int. Cl. C07c 3/54
U.S. Cl. 260—683.48                 8 Claims

ABSTRACT OF THE DISCLOSURE

Alkylatable compounds are alkylated with an alkylating agent in contact with an alkylation catalyst and in the presence of an aromatic polycyclic compound. The presence of this aromatic compound improves alkylate quality, particularly when utilized in the hydrogen fluoride alkylation of isobutane and butene.

BACKGROUND OF THE INVENTION

This invention relates to an alkylation process wherein the quality of the alkylate product is improved by alkylating an alkylatable compound in admixture with an alkylation catalyst and an aromatic polycyclic compound. More specifically, this invention relates to the production of branched chain saturated hydrocarbons by the catalytic alkylation of isoparaffins with olefins, particularly the alkylation of isobutane with a butene. It also relates to the alkylation of a monocyclic aromatic such as benzene with an olefin-acting compound.

Production of high molecular weight, branched-chain paraffins, having anti-knock properties and suitable for use in automotive and aviation fuels, is of considerable importance to the petroleum refining industry. The importance of producing such branched paraffins relates, in part, to the development and introduction of high compression automobile engines requiring high anti-knock fuels to obtain maximum power. These anti-knock fuels of high octane ratings are typically produced by the catalytic alkylation of isobutane with olefins such as propylene, the butylenes, the amylenes, and mixtures thereof. Other isoparaffins such as isopentane, isohexane, etc. are also readily capable of alkylation, but, since these hydrocarbons are in themselves of substantial value, they are not used extensively in alkylation processes.

In addition to isoparaffin-olefin alkylation the alkylation of benzene with $C_2$ to about $C_{16}$ olefins is also of great commercial importance. Ethylene is alkylated with benzene to form ethylbenzene which in turn can be dehydrogenated to form styrene, a valuable polymerizable hydrocarbon or, $C_{10}$–$C_{15}$ olefins when alkylated with benzene yield alkyl-substituted aromatic hydrocarbon suitable for conversion to surfactants such as detergents, wetting agents, etc.

It is well known in the prior art that the foregoing alkylation reactions utilize catalytic materials, such as essentially anhydrous hydrogen fluoride or sulfuric acid in which hydrocarbons are essentially insoluble. These prior art processes are generally effected by contacting the alkylatable hydrocarbon with an olefin in presence of the forementioned alkylation catalyst in a well-agitated reaction vessel or other reaction means capable of contacting the two immiscible hydrocarbon and acid phases. In these alkylation reactions, it is important to avoid localized concentrations of reactants such as olefins, since the olefin not only will alkylate but will also polymerize and undergo other undesirable side reactions. This is particularly important in the alkylation of an isoparaffin like isobutane with an olefin such as a butene where the alkylated product is to be utilized as a motor fuel. These undesired side reactions yield products of low octane number not capable of being used in high performance engines. Usually, these products have low octane numbers because they do not have the same high degree of branching as the higher octane branched paraffins. For example, in the alkylation of isobutane with butenes, the more highly branched trimethylpentanes are more desirable than the less branched dimethylhexanes or the $C_9+$ alkylate bottoms produced in the reaction. Further, the higher molecular weight products of polymerization or other side reactions crack, yielding $C_5$–$C_7$ materials, also of lower octane than the trimethylpentanes.

It is known in the prior art that these undesired reaction products can, in part, be minimized by manipulation of reaction variables such as temperature, reaction time, catalyst ratio, etc., and increasing the contact area between the immiscible hydrocarbon and catalyst phases by agitation, additives, and surface active agents.

SUMMARY OF THE INVENTION

Accordingly, it is an object of this invention to provide an alkylation process producing alkylate of excellent quality and to insure the most effective utilization of the reactants. Another object is to provide an alkylation process additive capable of increasing alklate quality. A further object of this invention is to inhibit the formation of low octane hydrocarbons in an isoparaffin-olefin alkylation. More particularly, it is an object of this invention to minimize the formation of branched di-methyl hexanes, $C_7$— light hydrocarbons, and $C_9+$ heavy hydrocarbons in the alkylation of isobutane with a butene.

In an embodiment, this invention relates to an alkylation process which comprises alkylating an alkylatable compound with an alkylating agent in admixture with an alkylating catalyst and an aromatic polycyclic compound. In a more limited embodiment, this invention relates to the alkylation of isobutane with a butene in admixture with hydrogen fluoride alkylation catalyst and an alkylanthracene.

DESCRIPTION OF PREFERRED EMBODIMENTS

Alkylatable compounds capable of undergoing alkylation in the process of this invention are the same compounds capable of alkylation in prior art processes. Examples of such compounds include the isoparaffins such as isobutane, isopentane, isohexane, etc., normal paraffins such as n-propane, n-butane, n-pentane, etc., aromatic hydrocarbons such as benzene, toluene, the xylenes, ethylbenzene, cumene, etc., substituted aromatic compounds such as phenol, thiophenol, resorcinol, quinone, anisole, ethoxybenzene, etc. Of the foregoing, the isoparaffins are preferred for paraffin alkylation and benzene for aromatic alkylation.

The alkylating agents capable of alkylating the foregoing alkylatable compounds include mono-olefins and polyolefins, alcohols, ethers esters, alkylhalides, alkylsulfates, and alkylphosphates. The preferred alkylating agents for the alkylation of isoparaffins for motor fuel production are the $C_3$–$C_8$ mono-olefins or mixtures thereof. These olefins can also be utilized as found in typical refinery streams and diluted with gases such as hydrogen, nitrogen, methane, ethane, etc.

Alkylation catalysts to be employed in the process of this invention are those alkylation catalysts known to the art and usually existing in the liquid phase at alkylation conditions and include the strong acids such as boron trifluoride, hydrogen fluoride, sulfuric acid, fluorosulfonic acid, and phosphoric acid. Essentially anhydrous hydrogen fluoride or catalysts using hydrogen fluoride as the essential active ingredient is the preferred catalyst of this invention. Excessive aqueous dilution of the foregoing acids is undesirable since it tends to reduce catalytic activity and introduce corrosion problems.

Alkylation conditions are chosen to minimize polymerization of the olefin and other side reactions, and preferably to maintain the reaction in the liquid phase. Alkylation temperatures are from about 0° to about 200° F. and alkylation pressures are from about atmospheric to about 50 atmospheres. Contact time in the alkylation reaction zone, defined as the ratio of catalyst volume within the reaction zone to volume rate per minute of hydrocarbon reactants charged to the reaction zone, will usually be less than 15 minutes and preferably less than 10 minutes. The alkylation catalyst is present in an amount sufficient to provide a catalyst to hydrocarbon volume ratio of about 0.5 to about 2.5. To reduce the tendency of the olefinic portion of the feedstock to polymerize, a molar proportion of alkylatable compound to alkylating agent is maintained at a value greater than 1 up to about 20:1 and preferably from about 3:1 to about 15:1.

The aromatic polycyclic compounds utilized to accomplish the objects of this invention are characterized as being soluble in the alkylation catalyst and of having a polycyclic molecular structure containing at least one benzene ring. These compounds can contain, in addition to the benzene ring, a saturated or unsaturated non-benzene cyclic group as well as being a fused ring aromatic compound. Examples of such compounds are the indanes, indenes, naphthalenes, biphenyls, anthracenes, phenanthrenes, acetnaphthenes, fluorenes, tetralins, chrysenes, pyrenes, picenes, benz(a)anthracene, naphthacene, perinaphthanes, benza(a)pyrenes, etc., with the anthracenes being preferred. These compounds may be obtained from coal tar, petroleum or any other suitable source. It is preferred that these compounds contain alkyl groups to avoid being alkylated by the alkylating agent in the alkylation reaction since this would lower the utilization of the alkylating agent in the desired product. However, since these compounds are readily separable from the final alkylation reaction effluent, because of their high boiling points, this loss would only be temporary since gradually all of the compounds would ultimately become alkylated and be immune to further alkylation when recycled back to the alkylation reaction. Thus, in effect, the alkylatable polycyclic compounds will ultimately be alkylated within the alkylation reaction but, as will hereinafter be pointed out, this does not lower the effectiveness of these compounds in improving the final desired alkylate product. In sulfuric acid catalyzed alkylation, these compounds will also be sulfonated but this also will not lower the effectiveness of these compounds in improving the final desired alkylate.

Varying proportions of these aromatic polycyclic compounds may be employed in the foregoing alkylation reactions. However, weight proportions of said compound to alkylation catalyst of about .001:1.0 to about .50:1.0 are preferred. In addition, these compounds may be used alone or with other alkylation additives known to the art.

The process of this invention may be effected in any suitable manner and may comprise batch or continuous type operations. In a typical batch type operation, the alkylation catalyst is first charged to the reactor followed by either the addition of a mixture of the alkylatable compound and an alkylating agent or by first adding the alkylatable compound followed by the addition of the alkylating agent with the aromatic polycyclic compound being admixed with either the alkylation catalyst or the reactants, preferably with the catalyst. The reactor is maintained at proper conditions of pressure and temperature for a predetermined time, after which the contents are separated into an acid phase and a product phase with the product phase being separated by conventional distillation techniques to recover the desired product alkylate. In a typical continuous operation, the reactants and catalyst are continuously charged through separate means to the alkylation reactor. As in the case of the batch reactor, the aromatic polycyclic compound may be admixed with either the catalyst or reactants or be added separately to the reaction zone. Upon termination of the desired residence time, the reactor effluent is continuously withdrawn, the unreacted materials, desired product and aromatic polycyclic catalyst compounds being separated from the effluent by means well known to the art.

EXAMPLE

The present invention is further described in the following illustrative example, which, however, is not presented for the purpose of limiting the scope of the invention, but for purposes of illustrating the present process.

To illustrate the effect of utilizing an aromatic polycyclic compound in an alkylation process, five experiments were performed in which isobutane was alkylated with 1-butene. With the exception of the type and/or amount of aromatic polycyclic compound present, all of the experiments were performed in an identical manner utilizing anhydrous hydrogen fluoride as catalyst and a hydrocarbon feedstock possessing the following composition as measured in mol percent: 10.9% 1-butene, 88.2% isobutane, 0.8% n-butane, and 0.1% propane.

A 980 ml. turbomixer maintained at 2° C. and 240 p.s.i.g. served as the reactor utilizing the following batch operation technique. The polycyclic aromatic compound, anthracene, and hydrogen fluoride were first charged to the reactor with the 1-butene-isobutane charge then added over a 30 minute period, to provide a 14.2/1.0 HF to 1-butene mol ratio, with stirring at 1700 r.p.m., followed by an addition 10 minute stirring period. At the completion of the reaction, the catalyst phase was separated from the hydrocarbon phase. The alkylate product was washed with an aqueous solution of potassium carbonate, dried and analyzed by gas-liquid chromatography.

In Test 1, no polycyclic aromatic compound was added. In Tests 2, 3, and 4, anthracene was added in an amount sufficient to provide a final catalyst-additive mixture of 15, 5, and 2 weight percent anthracene, respectively. In Test 5, 5 weight percent of a mixture of 2,6- and 2,7-di-tert-butylanthracenes and 2,6- and 2,7-di-sec-butylanthracenes were used instead of the unalkylated anthracene. A summary of the results obtained are presented in the following table. As used therein TMP/DMH represents the weight ratio of the tri-methylpentanes to di-methylhexanes, a higher value of which is indicative of a higher value octane number of the final alkylated product.

TABLE

|  | Test Number | | | | |
| --- | --- | --- | --- | --- | --- |
|  | 1 | 2 | 3 | 4 | 5 |
|  | Polycyclic additive type | | | | |
|  | None | Anthracene | Anthracene | Anthracene | Butylated anthracene |
| Additive percent of Catalyst phase | 0 | 15 | 5 | 2 | 5 |
| Liquid product analysis wt. percent: | | | | | |
| Pentanes | 0.2 | 0.2 | 0.2 | 0.2 | 0.3 |
| 2,3-dimethylbutane | 0.3 | 0.1 | 0.3 | 0.3 | 0.4 |
| 2-methylpentane | 0.3 | 0.1 | 0.1 | 0.2 | 0.3 |
| 3-methylpentane | 0.3 | 0.1 | (1) | (1) | 0.1 |
| 2,4-dimethylpentane | 0.4 | 0.2 | 0.3 | 0.5 | 0.4 |
| 2-methylhexane | 0.1 | 0.2 | 0.2 | (1) | (1) |
| 2,3-dimethylpentane | 0.1 | 0.2 | 0 | 0.1 | 0.2 |
| 3-methylhexane | 0.1 | (1) | (1) | (1) | (1) |
| 2,2,4-trimethylpentane | 20.9 | 22.8 | 28.9 | 25.1 | 27.9 |
| 2,2,3-trimethylpentane | 0.6 | 1.3 | 1.1 | 0.9 | 0.7 |
| 2,3,4-trimethylpentane | 10.1 | 31.3 | 25.5 | 17.8 | 19.4 |
| 2,3,3-trimethylpentane | 5.8 | 12.5 | 11.2 | 9.2 | 9.2 |
| 2,5-dimethylhexane | 1.7 | 0.7 | 0.9 | 1.0 | 1.1 |
| 2,4-dimethylhexane | 9.9 | 2.0 | 3.6 | 5.2 | 4.8 |
| 2,3-dimethylhexane | 39.0 | 11.9 | 23.2 | 32.7 | 28.7 |
| 2- and 4-methylheptane | (1) |  |  | 0.1 | 0.1 |
| 3,4-dimethylhexane | 3.8 | 0.8 | 1.8 | 2.7 | 2.1 |
| 3-methylheptane | 0.2 | 0.5 | 0.2 | 0.2 | 0.1 |
| 2,2,5-trimethylhexane | 0 | 0.2 | 0 | 0 | 0 |
| Other $C_9$ and $C_9+$ | 6.2 | 14.3 | 2.4 | 3.8 | 4.2 |
| Olefinic compounds |  | 0.6 | 0.1 |  |  |
| Total | 100.0 | 100.0 | 100.0 | 100 0 | 100.0 |
| TMP/DMH | .69 | 4.3 | 2.3 | 1.3 | 1.6 |

1 Trace.

From the foregoing example, it is readily apparent that the presence of an aromatic polycyclic compound within a catalytic alkylation system is of substantial benefit. In general, not only is the $C_7-$ and $C_9+$ make reduced but, more significantly, the tri-methylpentane-dimethylhexane ratio is substantially increased. This beneficial effect is accomplished through utilizing both an alkylated polycyclic compound and an unalkylated one indicating that both of which are satisfactory alkylation additives. Since the tri-methylpentanes have research clear octanes of about 100 or more versus the di-methylhexanes which have octane of only 55–75, the beneficial import of the presence of an aromatic polycyclic is obvious. The production of higher octane alkylate substantially reduces the production load on other refinery production methods such as reforming and satisfies the public's demand for such products.

I claim as my invention:

1. A process which comprises alkylating an isoparaffin with an olefin in admixture with an alkylating catalyst and from about 0.001 to about 0.50 weight proportions of an aromatic polycyclic compound per weight proportion of said catalyst, said polycyclic compound being selected from the group consisting of unsubstituted and alkyl-substituted aromatic hydrocarbons having 3 or 4 fused rings.

2. The process of claim 1, further characterized in that said catalyst is hydrogen fluoride.

3. The process of claim 1 further characterized in that said isoparaffin is isobutane, said olefin is a butene, said catalyst is hydrogen fluoride, and said polycyclic compound is anthracene.

4. The process of claim 1 further characterized in that said isoparaffin is isobutane, said olefin is a butene, said catalyst is hydrogen fluoride, and said polycyclic compound is an alkylanthracene.

5. The process of claim 4 further characterized in that said alkylanthracene is 2,6-di-tert-butylanthracene.

6. The process of claim 1 further characterized in that said isoparaffin is isobutane, said olefin is propylene, said catalyst is hydrogen fluoride, and said polycyclic compound is an alkylanthracene.

7. The process of claim 1 further characterized in that said isoparaffin is isobutane, said olefin is a mixture of propylene and butene, said catalyst is hydrogen fluoride, and said polycyclic compound is an alkylanthracene.

8. The process of claim 1 further characterized in that said isoparaffin is isobutane, said olefin is a butene, said catalyst is sulfuric acid, and said polycyclic compound is an alkylanthracene.

References Cited
UNITED STATES PATENTS 2,653,980   9/1953   Condon _____ 260—683.59
2,842,605   7/1958   Appell.

PAUL M. COUGHLAN, Jr., Primary Examiner

G. J. CRASANAKIS, Assistant Examiner

U.S. Cl. X.R.
260—683.59